(12) United States Patent
Nelson et al.

(10) Patent No.: US 12,202,440 B2
(45) Date of Patent: Jan. 21, 2025

(54) DEVICE AND SYSTEM TO HOLD CARGO WHEN REAR VEHICLE SEATS DO NOT LAY FLAT

(71) Applicants: John Robert-Winfred Nelson, Port Orange, FL (US); Jack Winfred Nelson, Port Orange, FL (US)

(72) Inventors: John Robert-Winfred Nelson, Port Orange, FL (US); Jack Winfred Nelson, Port Orange, FL (US)

( * ) Notice: Subject to any disclaimer, the term of this patent is extended or adjusted under 35 U.S.C. 154(b) by 144 days.

(21) Appl. No.: 17/868,418

(22) Filed: Jul. 19, 2022

(65) Prior Publication Data

US 2024/0025347 A1 Jan. 25, 2024

(51) Int. Cl.
B60R 7/04 (2006.01)

(52) U.S. Cl.
CPC .................................. B60R 7/043 (2013.01)

(58) Field of Classification Search
CPC ... B60R 7/043; B60R 7/04; B60R 2011/0012; B60N 3/002; B60N 3/004; B60N 3/001; A47B 31/06; A47B 23/001
USPC .............................. 224/275; 248/148; 108/44
See application file for complete search history.

(56) References Cited

U.S. PATENT DOCUMENTS

| | | | | | |
|---|---|---|---|---|---|
| 2,633,180 | A * | 3/1953 | Reed | ...................... | B60N 2/787 312/235.8 |
| 3,338,629 | A * | 8/1967 | Drees | ...................... | B60R 7/043 312/235.8 |
| 3,434,650 | A * | 3/1969 | Goings | .................. | B65D 71/72 206/563 |
| 4,417,764 | A * | 11/1983 | Marcus | .................. | B60N 2/793 297/188.17 |
| 4,801,060 | A * | 1/1989 | Thompson | ............. | B60N 3/103 224/544 |
| 5,322,021 | A * | 6/1994 | Jackson | ................. | B60N 3/002 108/45 |
| 5,372,403 | A * | 12/1994 | Puerto | ...................... | A47C 7/70 297/188.17 |
| 6,015,198 | A * | 1/2000 | Stair | ...................... | B60R 7/043 297/188.11 |
| 6,422,440 | B1 * | 7/2002 | Stone | ...................... | B60R 7/043 D12/426 |
| 7,455,204 | B2 * | 11/2008 | Lippert | ................... | B60R 7/043 224/42.32 |
| 8,501,294 | B1 * | 8/2013 | Wheatley | ............... | B60R 11/02 428/40.1 |
| 10,899,280 | B2 * | 1/2021 | Taylor | .................... | B60R 7/043 |
| 11,498,488 | B2 * | 11/2022 | Setina | ................... | B60R 21/026 |
| 2008/0083351 | A1 * | 4/2008 | Lippert | ................... | B60R 7/043 108/44 |

* cited by examiner

*Primary Examiner* — Adam J Waggenspack
(74) *Attorney, Agent, or Firm* — The Law Office of John R. Nelson, PA; John R. Nelson, Esq.

(57) ABSTRACT

A device and system to hold cargo when rear vehicle seats do not lay flat to assist a person with storing and safely securing cargo. The device is made of a flat shelf to hold cargo, connected to a middle crosswise brace and longitudinal braces for support. A compartment area is created by the crosswise brace and longitudinal braces to store or hide small items. Using the device will protect the seats and give stability to the cargo.

9 Claims, 17 Drawing Sheets

DEVICE AND SYSTEM TO HOLD CARGO WHEN REAR VEHICLE SEATS DO NOT LAY FLAT

BACKGROUND

The following discussion is not to be deemed admitted prior art but merely related art to show possible background and information related to holding cargo and creating a flat storage area.

On some vehicles when the rear seats lay down the aft cargo area and seats do not create a flat cargo storage area. A challenge arises as to how to store items that are larger than the seats or the other cargo area.

Currently, there are few solutions to store cargo when seats do not lay flat. Some of these solutions attempt to use blocks made of foam or wood to even the surface. Still other solutions involve placing cargo on the backs of the flattened seats and hoping the cargo does not shift. Still other solutions require removing the seats.

Each of these solutions fail to meet the needed solution because they are difficult to use, cumbersome, unreliable, possibly unsafe, and interfere with the normal handling and operation of the holding cargo and creating a flat storage area.

Therefore, a need exists for a novel device and system to hold cargo when rear vehicle seats do not lay flat to create a flat storage area.

BRIEF SUMMARY OF THE INVENTION

This invention relates generally to, but is not limited to, creating a flat cargo storage area in the rear of a vehicle when the seats do not lay flat.

Disclosed are numerous aspects of a unique device and system to hold cargo when rear vehicle seats do not lay flat.

It is desirable to have a device and system to use in a vehicle creating a flat storage area to be used safely. Furthermore, it is desirable to have a device and system to hold cargo when rear vehicle seats do not lay flat that is removable. Furthermore, it is desirable that a device and system to hold cargo when rear vehicle seats do not lay flat be lightweight. Furthermore, it is desirable that a device and system to hold cargo when rear vehicle seats do not lay flat be strong to support cargo of varying weight. Furthermore, it is desirable the components used to make a device and system to hold cargo when rear vehicle seats do not lay flat resist exposure to varying temperatures and elements.

The disclosed invention advantageously fills these needs and addresses the aforementioned deficiencies by providing an easy to use, lightweight, strong, durable, and safe holder for a holding cargo and creating a flat storage area.

BRIEF DESCRIPTION OF THE DRAWINGS

A device and system to hold cargo when rear vehicle seats do not lay flat is illustrated by way of example, and not by way of limitation, in the figures of the accompanying drawings.

While aspects of a device and system to hold cargo when rear vehicle seats do not lay flat will be described with reference to the details of the embodiments of the invention shown in the drawings (and some embodiments not shown in the drawings), these details are not intended to limit the scope of the invention.

LIST OF FIGURE ITEMS

Figure 1:
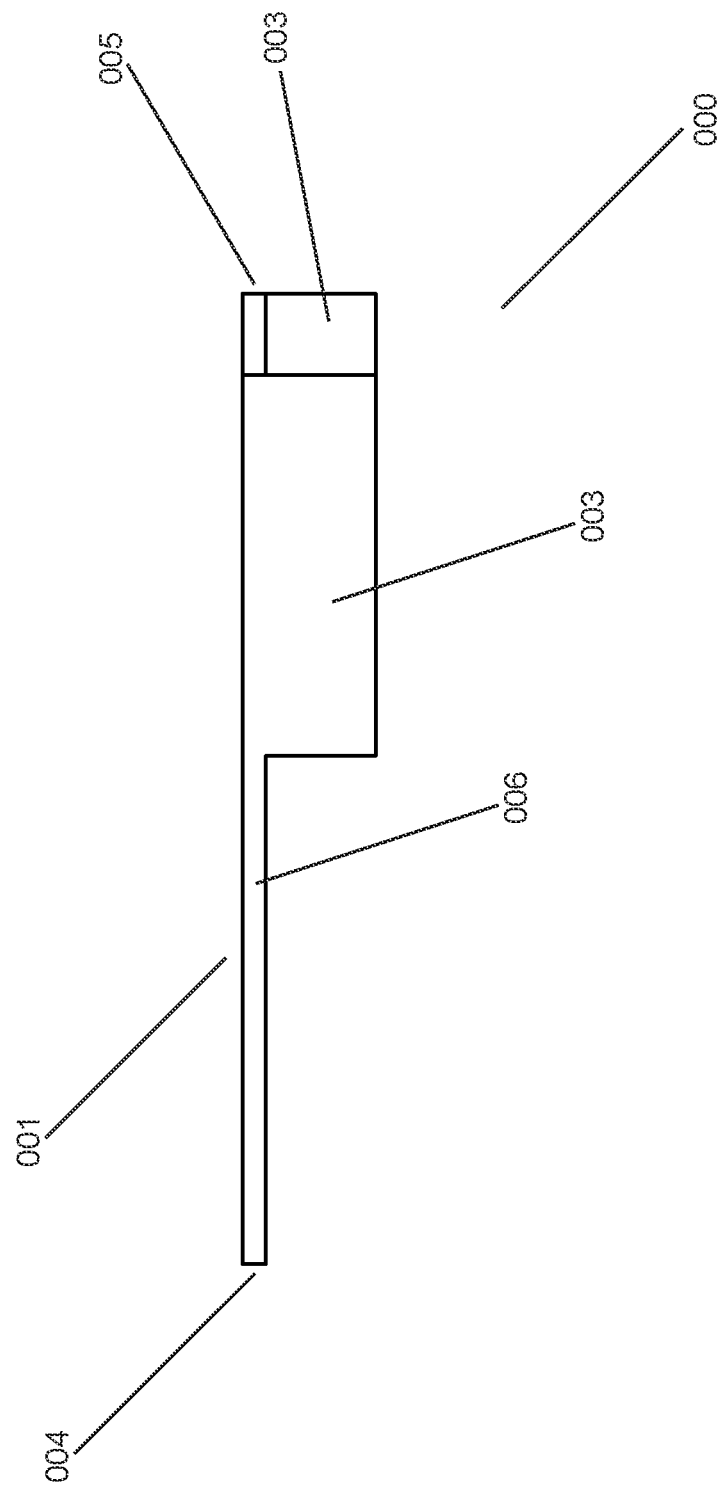
FIG. 1. A left side view of a device and system to hold cargo when rear vehicle seats do not lay flat.

000 A device and system to hold cargo when rear vehicle seats do not lay flat
001 A flat shelf
002 A middle crosswise brace
003 A longitudinal brace
004 A front edge
005 A rear edge
006 A left edge
007 A right edge
008 A hinged seat cover
009 A drawer

DETAILED DESCRIPTION

The order of the steps of disclosed processes may be altered within the scope of the invention.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. A device and system to hold cargo when rear vehicle seats do not lay flat may, however, be embodied in many different forms and should not be construed as being limited to the embodiments set forth herein; rather, these embodiments are provided by way of illustration only and so that this disclosure will be thorough, complete and fully convey understanding to those skilled in the art.

For the purposes of promoting an understanding of the principles of a device and system to hold cargo when rear vehicle seats do not lay flat, reference will now be made to the embodiments illustrated in the drawings and specific language will be used to describe the same, only as examples and not intended to be limiting.

A cargo area in a vehicle (hereafter referred to as "cargo area"), as used herein may be, but is not limited to, a two-door vehicle, a four-day vehicle, an SUV cargo area, a hatchback cargo area, a cargo area with a flat deck and seats that are higher than the flat deck when installed, and a cargo area with a depressed storage area aft of the seats.

Disclosed is a device and system to hold cargo when rear vehicle seats do not lay flat, comprising the following components: (1) a flat shelf 001; (2) a middle crosswise brace 002; (3) a plurality of longitudinal braces 003.

These components generally speaking, are configured as follows: (1) a flat shelf 001 has a middle crosswise brace connected perpendicular to the underside of the flat shelf from the left edge 006 to the right edge 007; (2) a longitudinal brace is connected perpendicular to the flat shelf and spans from the rear edge 005 to the middle crosswise brace along the left edge 006; (3) a longitudinal brace is connected perpendicular to the flat shelf and spans from the rear edge 005 to the middle crosswise brace along the right edge 007; (4) the braces are each on the same side of the flat shelf to create a flat shelf surface area on the opposite side.

A device and system to hold cargo when rear vehicle seats do not lay flat may also have one or more of the following: a cut out on the rear edge 005 to allow a cargo door to close; cut-outs for headrests on the front edge 004; a flat shelf having a longer rectangular shape for large cargo areas, a flat shelf having an "L" shape; a longitudinal brace at a midpoint between the left edge 006 and right edge 007; a drawer assembly between the middle crosswise brace and the longitudinal braces, curved or shaped edges; a skid-resistant surface on the cargo receiving area of the flat shelf; rings to secure cargo; a plurality of eyelets to hang the device when storing it; a longitudinal brace that extends above the top surface area when deployed as an "L" shape; a hinged piece to cover a rear passenger seat and create a "L" shape.

The disclosed device and system to hold cargo when rear vehicle seats do not lay flat is unique when compared with other known devices and solutions because it provides: (1) for operation without interfering with how the seats work in the vehicle; (2) is reusable; (3) has no fabrication requirements required to a vehicle; (4) supports cargo evenly that would not otherwise fit in a vehicle properly.

The disclosed device and system to hold cargo when rear vehicle seats do not lay flat is unique in that it is structurally different from other known devices or solutions. More specifically, the device is unique due to the presence of (1) a flat shelf that can vary in size and be adapted to different cargo areas; (2) a flat shelf made of different materials; (3) a middle crosswise brace that provides structural support and protects the seat backs from the cargo load; (4) longitudinal braces; (5) longitudinal braces balancing and evening a flat shelf; (6) is lightweight.

In some embodiments of versions of a device and system to hold cargo when rear vehicle seats do not lay flat a flat shelf 001, a middle crosswise brace 002, a longitudinal brace 003, may be separate components.

In some embodiments of versions of a device and system to hold cargo when rear vehicle seats do not lay flat a flat shelf 001, a middle crosswise brace 002, a longitudinal brace 003, may be connected via adhesives, a plurality of fasteners, a combination of joints and adhesives.

In some embodiments of versions of a device and system to hold cargo when rear vehicle seats do not lay flat a flat shelf 001, a middle crosswise brace 002, a longitudinal brace 003, may be a single component.

In some embodiments of versions of a device and system to hold cargo when rear vehicle seats do not lay flat a flat shelf 001 may vary in size, for example, and not meant to be limiting, having a length of 76 cm to 183 cm (approximately 30 inches to 72 inches), a width of 76 cm to 122 cm (approximately 30 inches to 48 inches) and a thickness of 0.5 cm to 5 cm (approximately ½ inch to 2 inches).

In some embodiments of versions of a device and system to hold cargo when rear vehicle seats do not lay flat a flat shelf 001 may be of a size to fit a two-door Ford Bronco and may vary in size, for example, and not meant to be limiting but more particularly, having a length of 114.3 cm (approximately 45 inches), a width of 106.6 cm (approximately 42 inches) and a thickness of 0.5 cm to 2.54 cm (approximately ½ inch to 1 inch).

In some embodiments of versions of a device and system to hold cargo when rear vehicle seats do not lay flat a middle crosswise brace 002 may vary in size, for example, and not meant to be limiting, having a length of 76 cm to 122 cm (approximately 30 inches to 48 inches), a width of 5 cm to 20.3 cm (approximately 2 inch to 8 inches) and a thickness of 0.5 cm to 5 cm (approximately ½ inch to 2 inches).

In some embodiments of versions of a device and system to hold cargo when rear vehicle seats do not lay flat a middle crosswise brace 002 may be of a size to fit a two-door Ford Bronco and may vary in size, for example, and not meant to be limiting but more particularly, having a length of 106.6 cm (approximately 42 inches), a width of 12.7 cm (approximately 5 inches) and a thickness of 0.5 cm to 2.54 cm (approximately ½ inch to 1 inch).

In some embodiments of versions of a device and system to hold cargo when rear vehicle seats do not lay flat a longitudinal brace 003 may vary in size, for example, and not meant to be limiting, having a length of 25.4 cm to 101.6 cm (approximately 10 inches to 40 inches), a width of 5 cm to 20.3 cm (approximately 2 inches to 8 inches) and a thickness of 0.5 cm to 5 cm (approximately ½ inch to 2 inches).

In some embodiments of versions of a device and system to hold cargo when rear vehicle seats do not lay flat a longitudinal brace 003 may be of a size to fit a two-door Ford Bronco and may vary in size, for example, and not meant to be limiting but more particularly, having a length of 48.3 cm (approximately 19 inches), a width of 12.7 cm (approximately 5 inches) and a thickness of 0.5 cm to 2.54 cm (approximately ½ inch to 1 inch).

In some embodiments of versions of a device and system to hold cargo when rear vehicle seats do not lay flat a longitudinal brace 003 for a left edge 006 may be of a size to fit a two-door Ford Bronco and may vary in size, for example, and not meant to be limiting but more particularly, having a length of 40.6 cm (approximately 16 inches), a width of 12.7 cm (approximately 5 inches) and a thickness of 0.5 cm to 2.54 cm (approximately ½ inch to 1 inch).

In some embodiments of versions of a device and system to hold cargo when rear vehicle seats do not lay flat the flat shelf 002 may have a contoured shape or cut-out along a read edge 005 to allow a cargo door to close.

In some embodiments of versions of a device and system to hold cargo when rear vehicle seats do not lay flat the flat shelf 002 may have a plurality of cut-outs for head rests on the front edge 004.

In some embodiments of versions of a device and system to hold cargo when rear vehicle seats do not lay flat a flat shelf 001 may have an area removed to create an "L" shape wherein such area is approximately of a length of 38 cm to 91 cm (approximately 15 inches to 36 inches) and a width of 38 cm to 61 cm (approximately 15 inch to 24 inches).

In some embodiments of versions of a device and system to hold cargo when rear vehicle seats do not lay flat a flat shelf 001 may have an area removed to create an "L" shape of a size to fit a two-door Ford Bronco and may vary in size, for example, and not meant to be limiting but more particularly, having a length of 63.3 cm (approximately 25 inches), a width of 53.3 cm (approximately 21 inches) and a thickness of 0.5 cm to 2.54 cm (approximately ½ inch to 1 inch).

In some embodiments of versions of a device and system to hold cargo when rear vehicle seats do not lay flat the flat shelf 001, the middle crosswise brace 002, and the longitudinal braces 003, may be made of materials like, but not limited to, metal, plastic, polystyrene resin, fiberglass, carbon fiber, rubber, foam, PVC (polyvinyl acetate), EVA (ethylene-vinyl acetate), high density polyethylene (HDPE), wood, and bamboo.

In some embodiments of versions of a device and system to hold cargo when rear vehicle seats do not lay flat the flat shelf 001, the middle crosswise brace 002, and the longitudinal braces 003, may be made of materials like, but not limited to, but more particularly, Owens Corning FOAMULAR (polystyrene resin), prepared with appropriate paint, and covered in fiberglass resin.

In some embodiments of versions of a device and system to hold cargo when rear vehicle seats do not lay flat the flat shelf 001, the middle crosswise brace 002, and the longitudinal braces 003, may be made of materials like, but not limited to, but more particularly, plastic HDPE.

In some embodiments of versions of a device and system to hold cargo when rear vehicle seats do not lay flat the middle crosswise brace 002 may be curved or notched to fit various rear seat configurations.

Some embodiments of a device and system to hold cargo when rear vehicle seats do not lay flat may have an "L" shape. The "L" shape may be for either the left or right rear seat to be exposed.

Some embodiments of a device and system to hold cargo when rear vehicle seats do not lay flat may have an "L" shape and use a hinged cover. The "L" shape may be for either the left or right rear seat to be exposed. The hinged cover will close over one of the seats to give a flat surface.

FIG. 1. A left side view of a device and system to hold cargo when rear vehicle seats do not lay flat. A longitudinal brace 003 is connected to a flat shelf 001 along a left edge 006.

Figure 2:
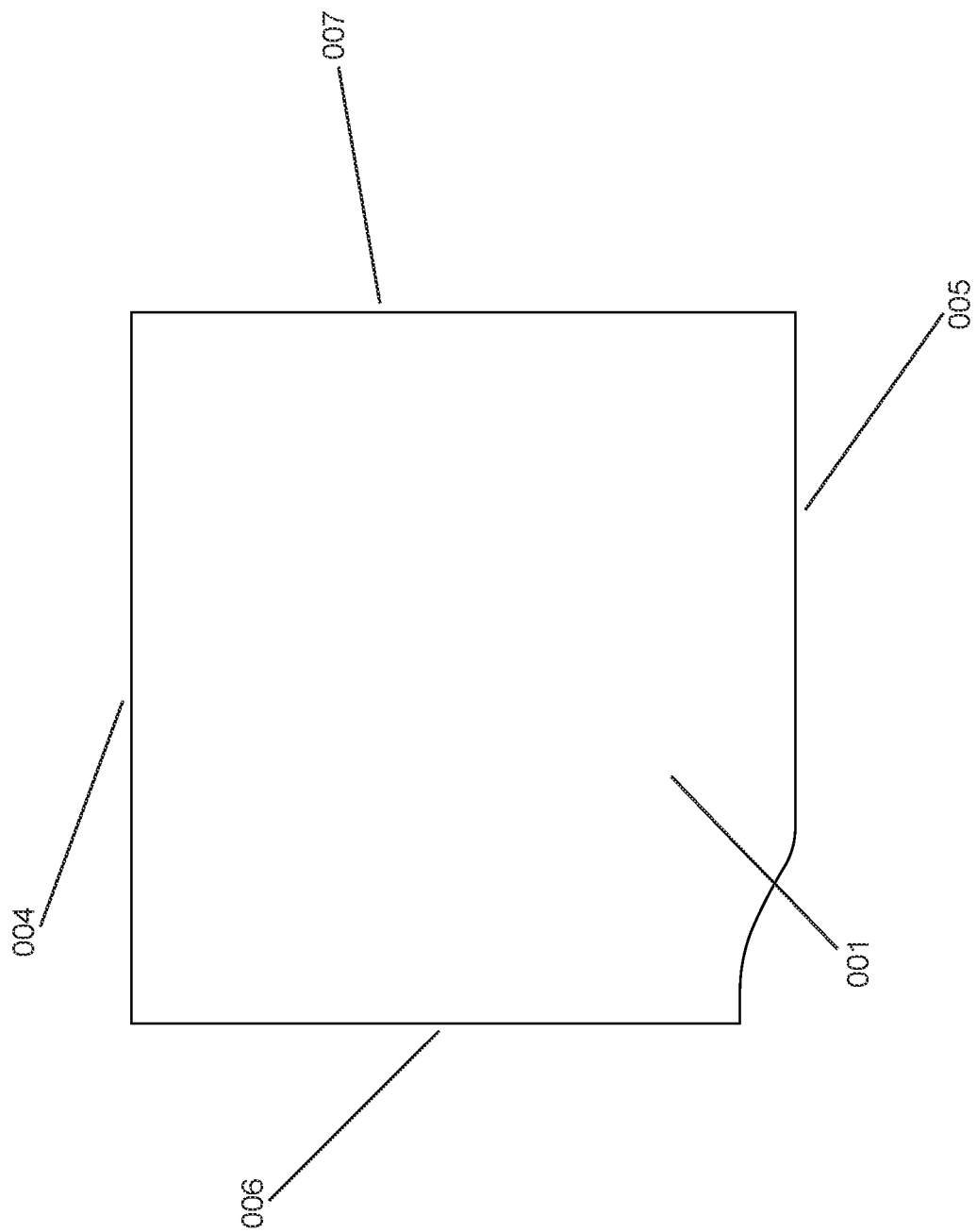
FIG. 2. A top view of a device and system to hold cargo when rear vehicle seats do not lay flat.

FIG. 2. A top view of a device and system to hold cargo when rear vehicle seats do not lay flat. A rear edge 005 has a cut-out contour.

Figure 3:
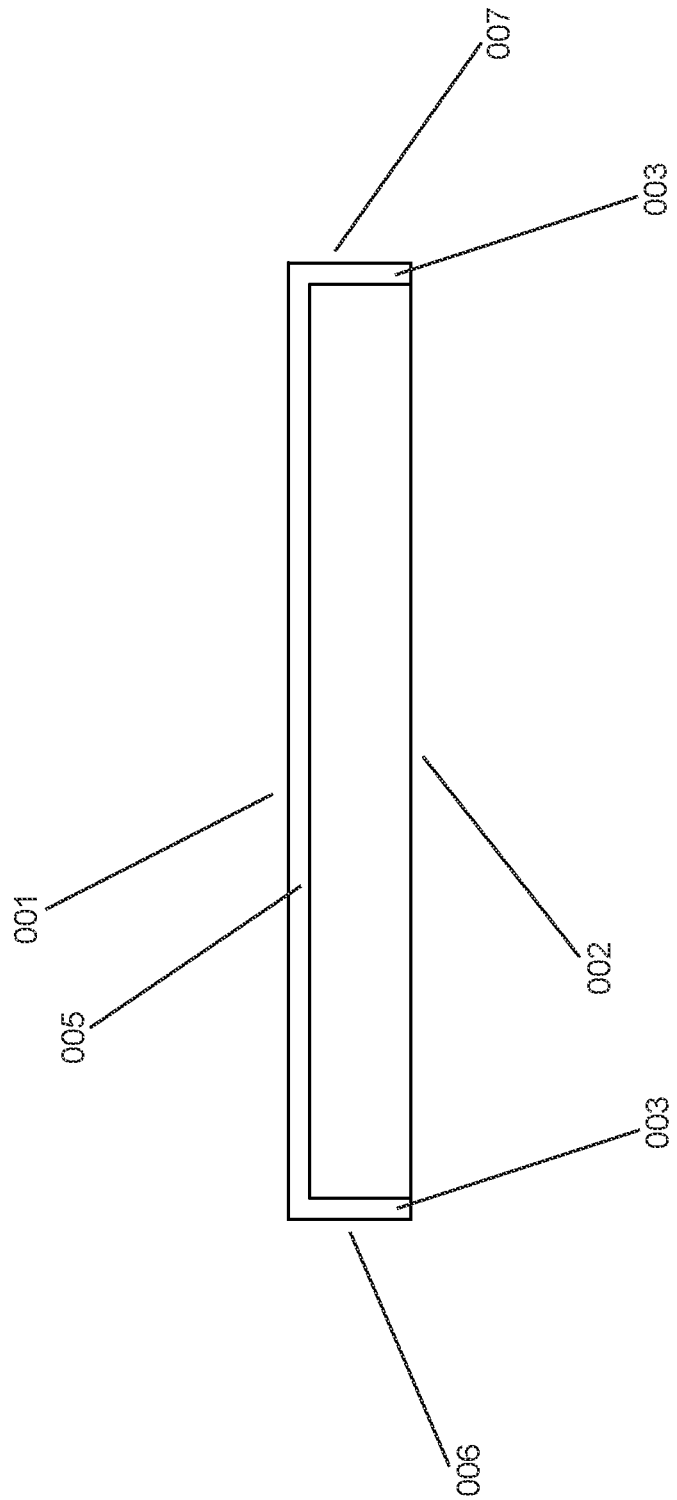
FIG. 3. A rear view of a device and system to hold cargo when rear vehicle seats do not lay flat rotated 90° clockwise rear-view from FIG. 1.

FIG. 3. A rear view of a device and system to hold cargo when rear vehicle seats do not lay flat rotated 90° clockwise rear-view from FIG. 1. A crosswise brace 002 is connected perpendicular on the underside of a flat shelf 001. Longitudinal braces 003 are connected perpendicular to a flat shelf 001 and connected perpendicular to the crosswise brace 002.

Figure 4:
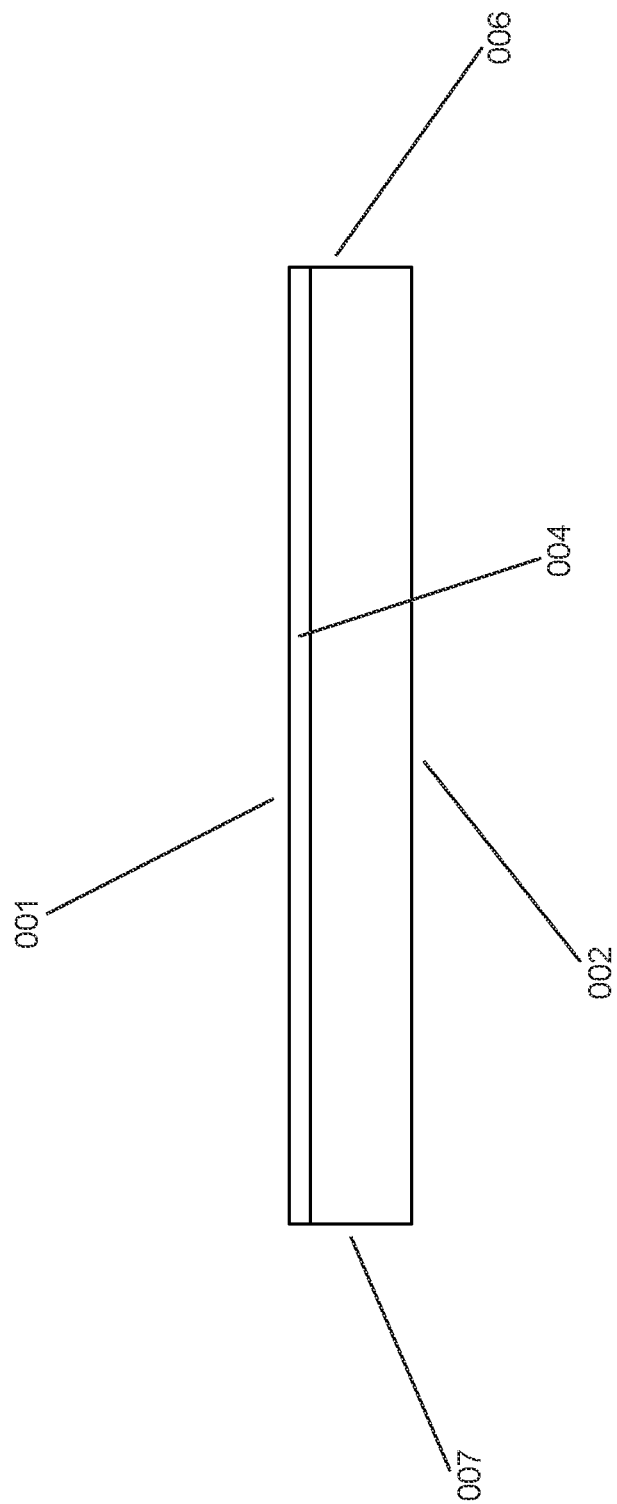
FIG. 4. A front view of a device and system to hold cargo when rear vehicle seats do not lay flat rotated 90° counter-clockwise front-view from FIG. 1.

FIG. 4. A front view of a device and system to hold cargo when rear vehicle seats do not lay flat rotated 90° counter-clockwise front-view from FIG. 1. A crosswise brace 002 is connected perpendicular to a flat shelf 001 and spans from a left edge 006 and a right edge 007.

Figure 5:
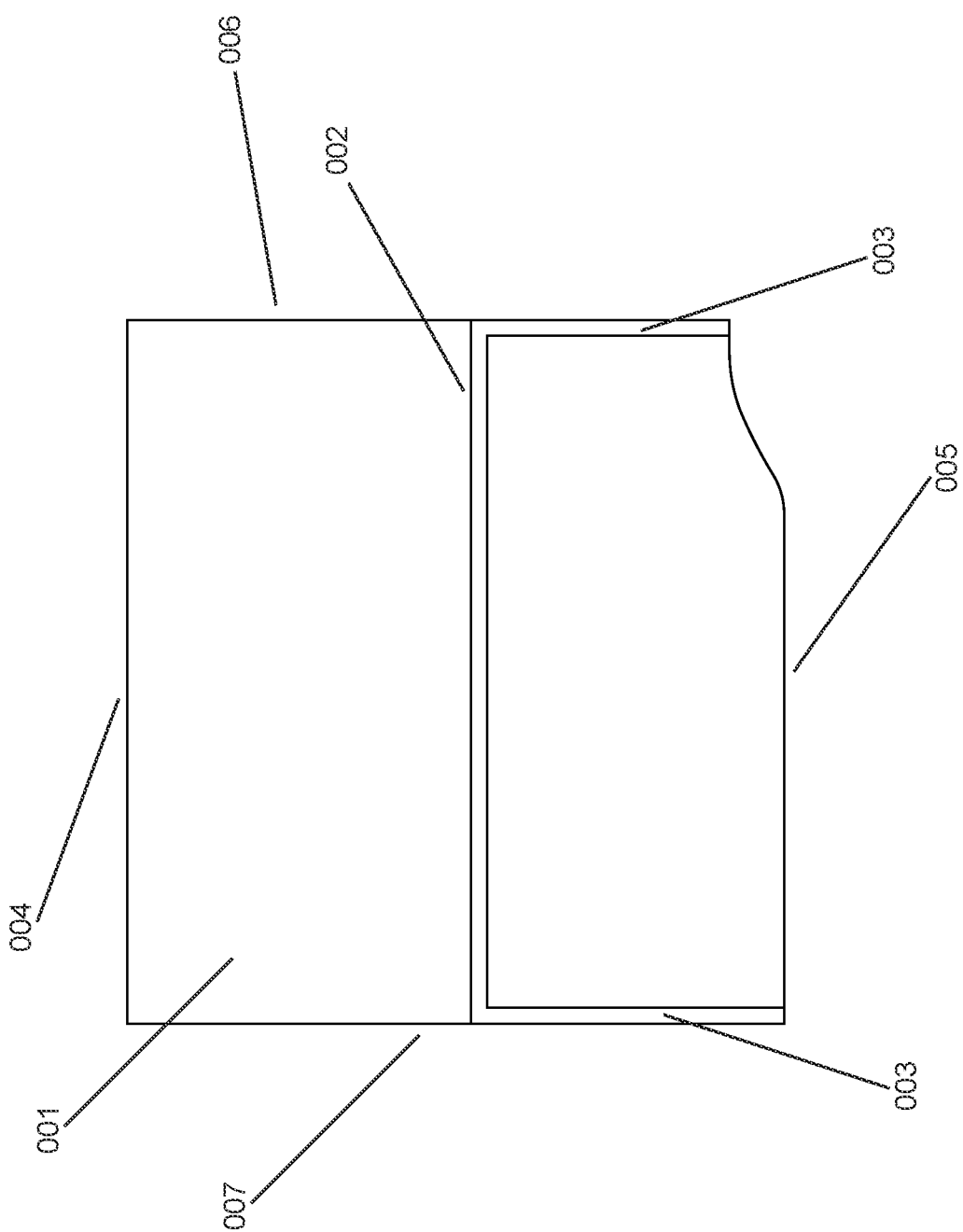
FIG. 5. A bottom view of a device and system to hold cargo when rear vehicle seats do not lay flat.

FIG. 5. A bottom view of a device and system to hold cargo when rear vehicle seats do not lay flat. A crosswise brace 002 is connected perpendicular to a flat shelf 001 and spans from a left edge 006 and a right edge 007. Longitudinal braces 003 are connected perpendicular to a flat shelf 001 and span from a rear edge 005 to the crosswise brace 002.

Figure 6:
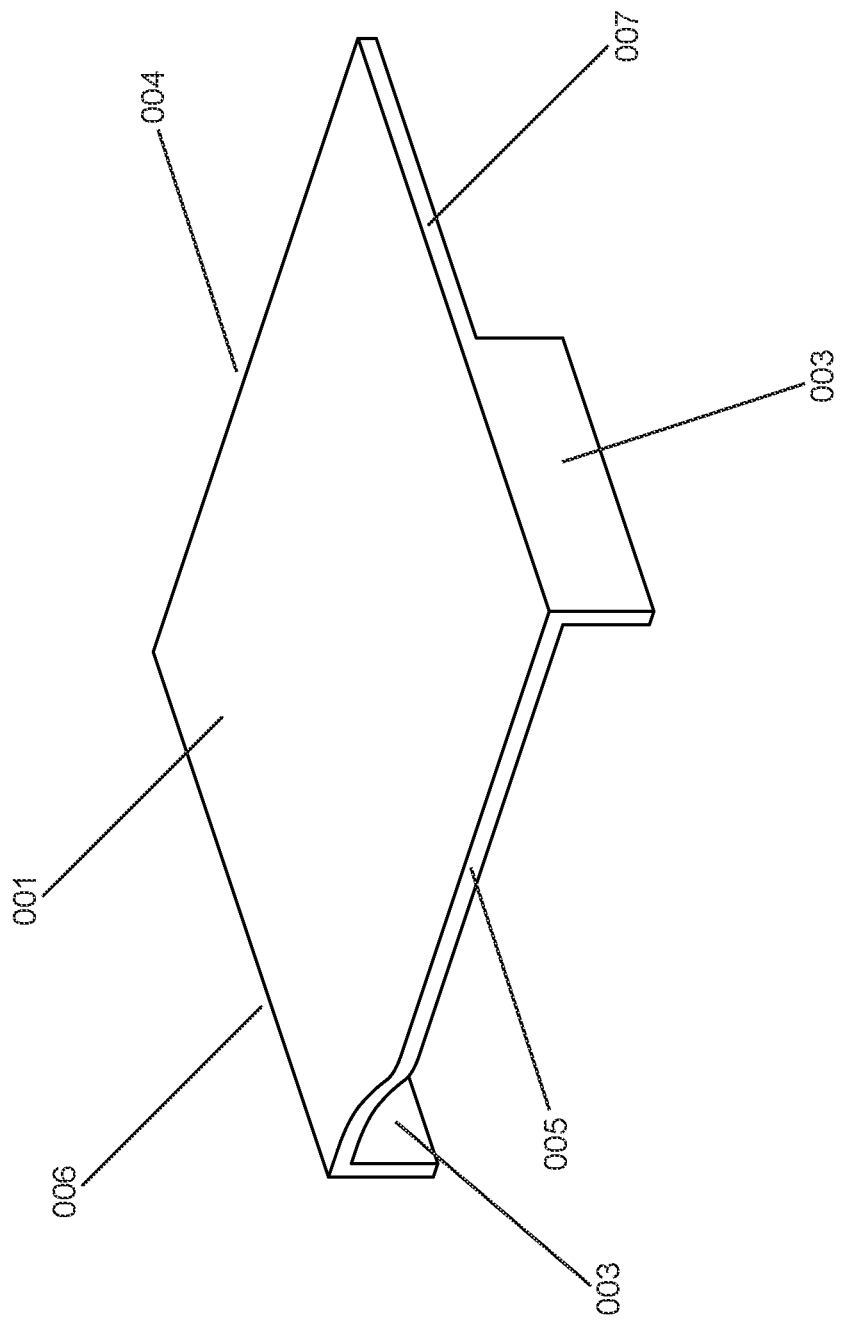
FIG. 6. A perspective view of a device and system to hold cargo when rear vehicle seats do not lay flat.

FIG. 6. A perspective view of a device and system to hold cargo when rear vehicle seats do not lay flat. A cut-out contour is shown on a rear edge 005.

Figure 7:
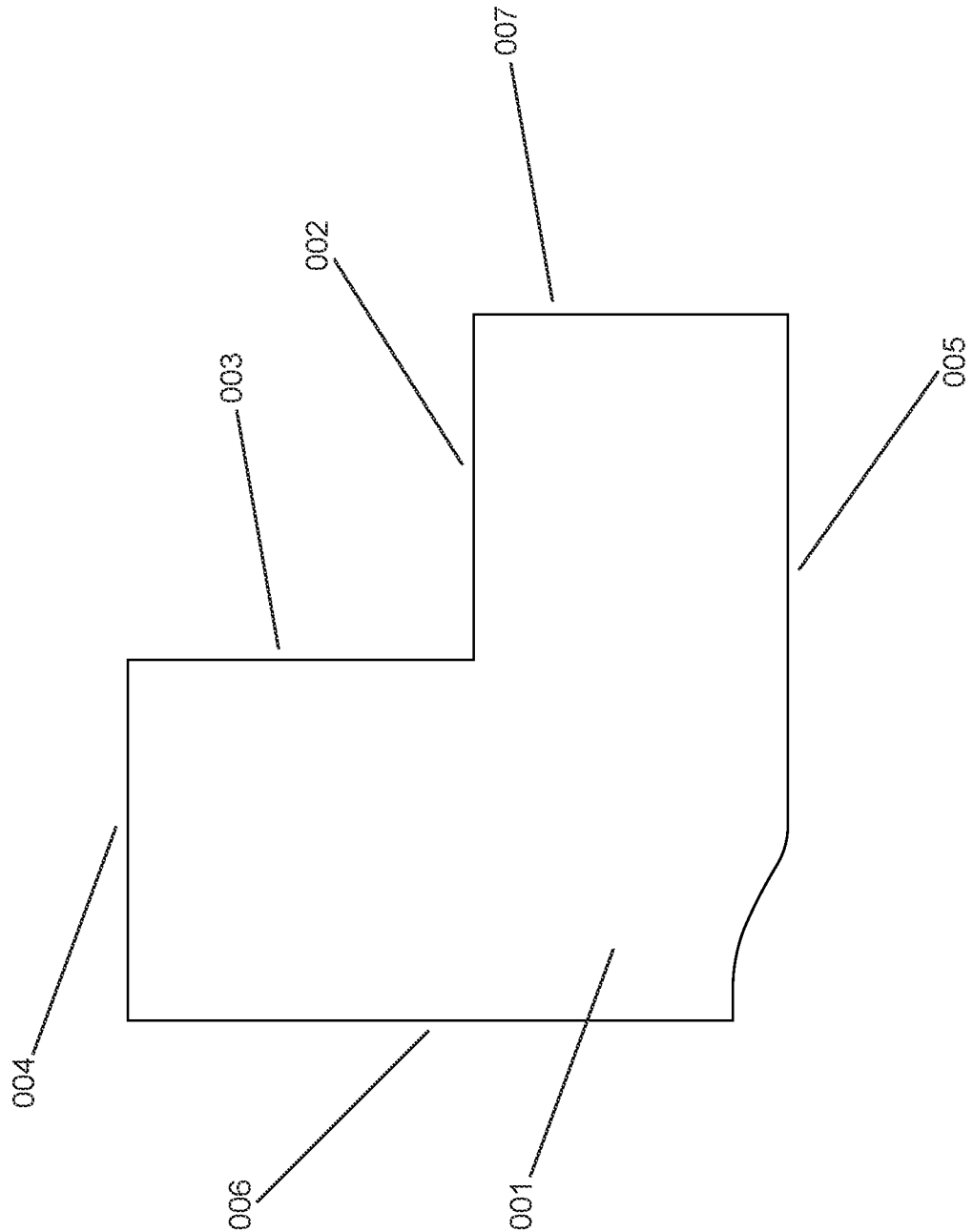
FIG. 7. A top view of an "L" shaped device and system to hold cargo when rear vehicle seats do not lay flat.

FIG. 7. A top view of an "L" shaped device and system to hold cargo when rear vehicle seats do not lay flat.

Figure 8:
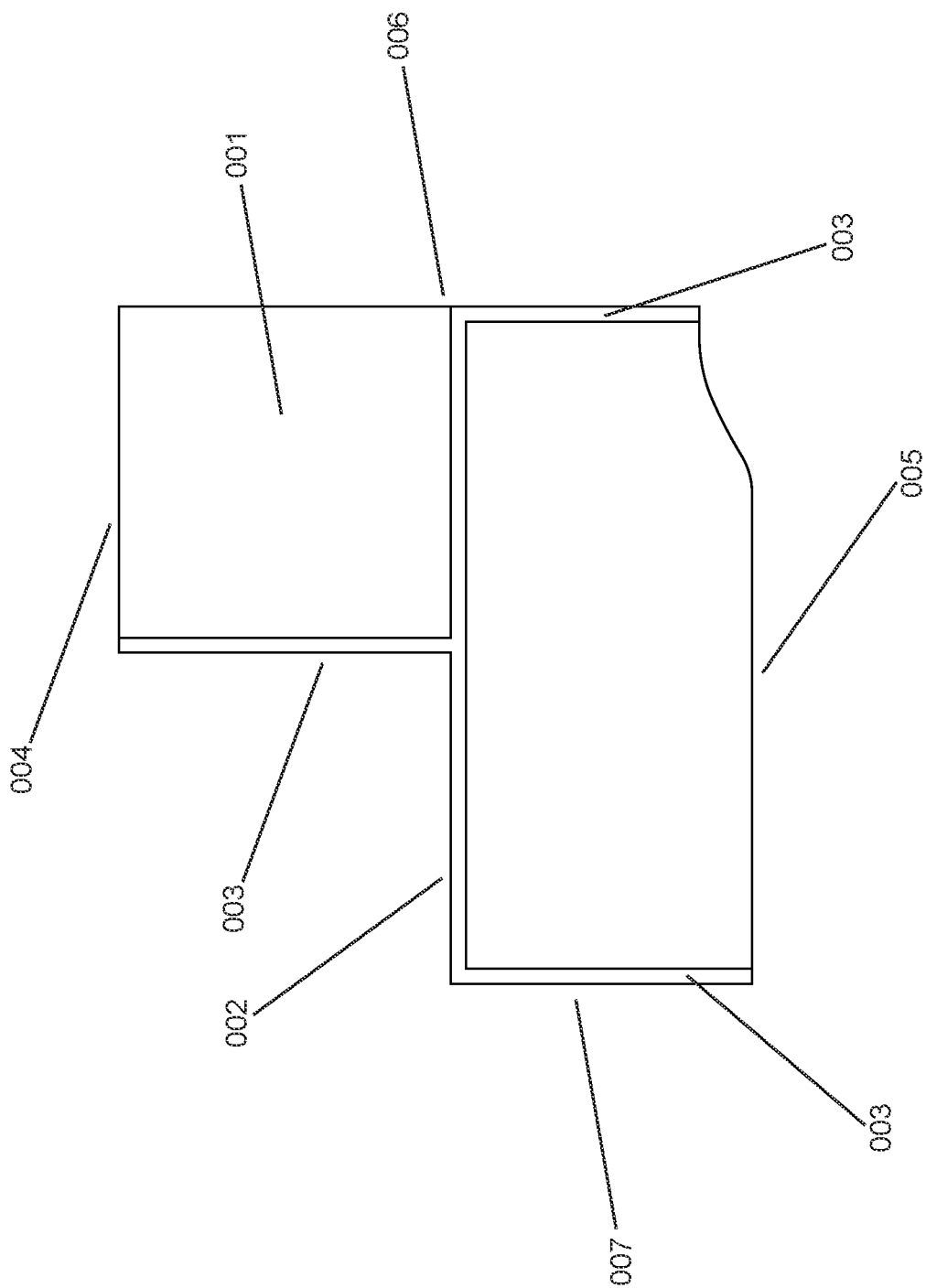
FIG. 8. A bottom view of an "L" shaped device and system to hold cargo when rear vehicle seats do not lay flat.

FIG. 8. A bottom view of an "L" shaped device and system to hold cargo when rear vehicle seats do not lay flat. A crosswise brace 002 is connected perpendicular to a flat shelf 001 and spans from a left edge 006 and a right edge 007. Longitudinal braces 003 are connected perpendicular to a flat shelf 001 and span from a rear edge 005 to the crosswise brace 002. A flat shelf has an "L" shape and a longitudinal brace 003 spans from a crosswise brace 002 to a front edge 004.

Figure 9:
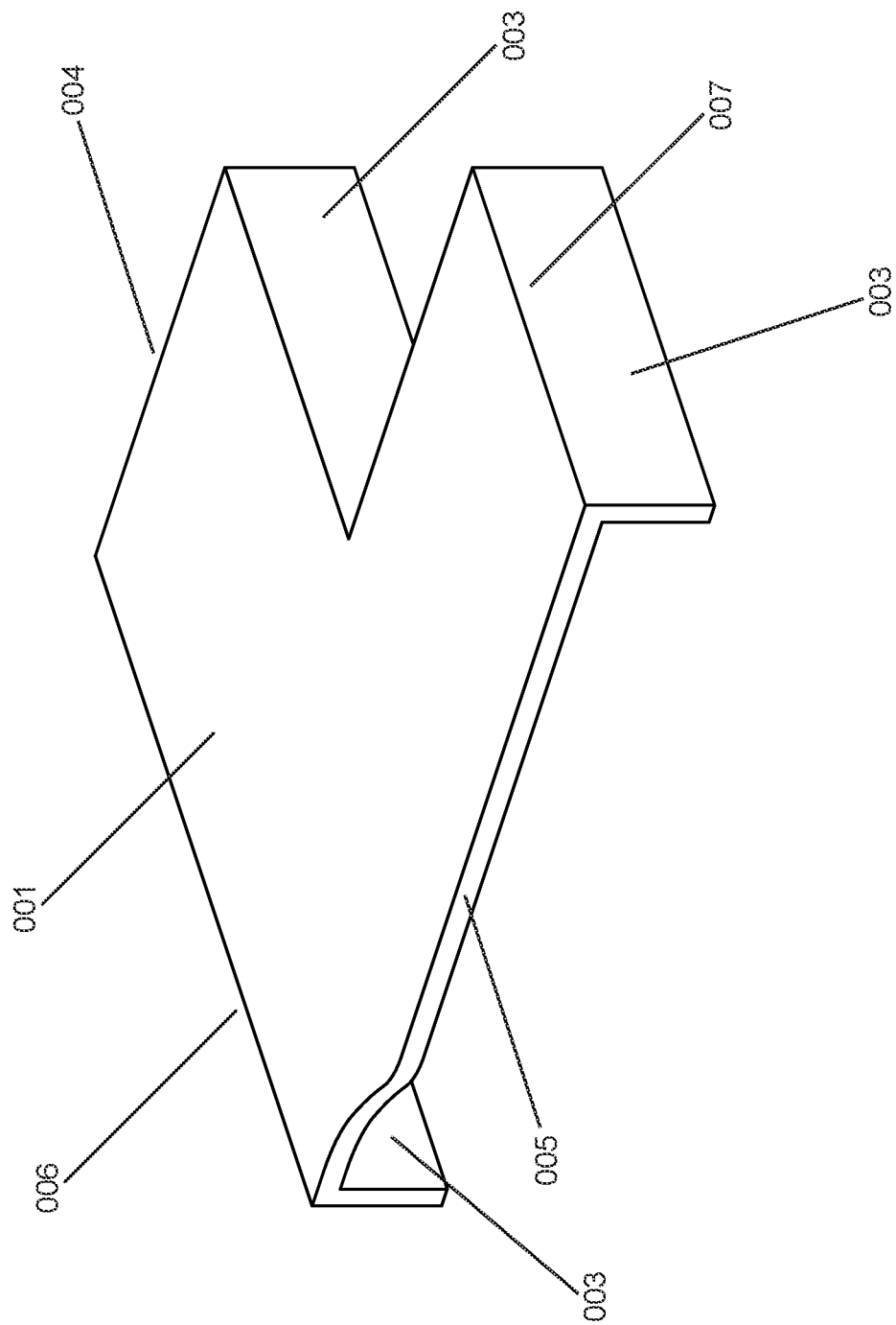
FIG. 9. A perspective view of an "L" shaped device and system to hold cargo when rear vehicle seats do not lay flat.

FIG. 9. A perspective view of an "L" shaped device and system to hold cargo when rear vehicle seats do not lay flat. Longitudinal braces 003 are connected perpendicular to a flat shelf 001 and span from a rear edge 005 to the crosswise brace 002. A flat shelf has an "L" shape and a longitudinal brace 003 spans from a crosswise brace 002 to a front edge 004.

Figure 10:
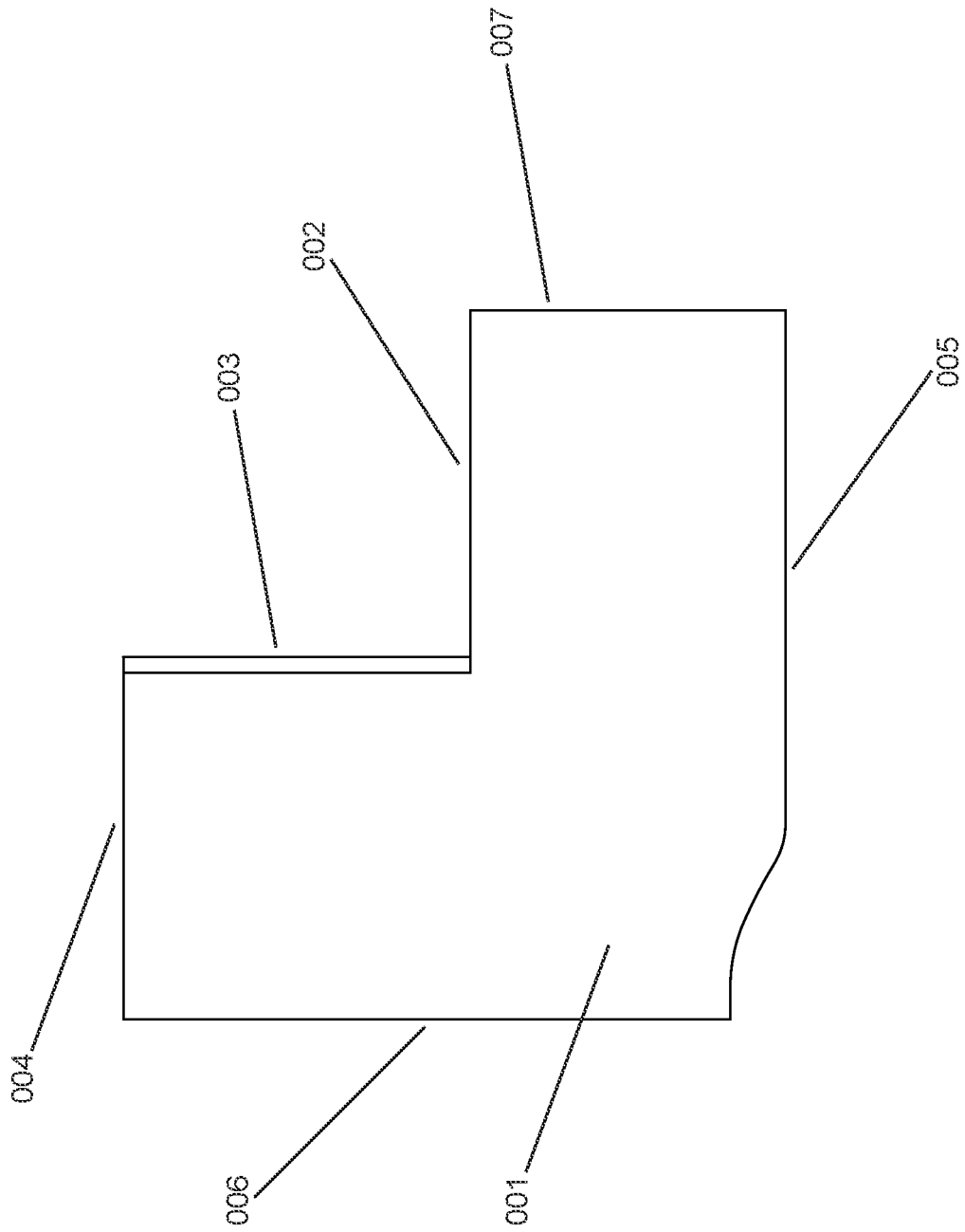
FIG. 10. A top view of an "L" shaped device and system to hold cargo when rear vehicle seats do not lay flat with a raised longitudinal brace.

FIG. 10. A top view of an "L" shaped device and system to hold cargo when rear vehicle seats do not lay flat with a raised longitudinal brace 003.

Figure 11:
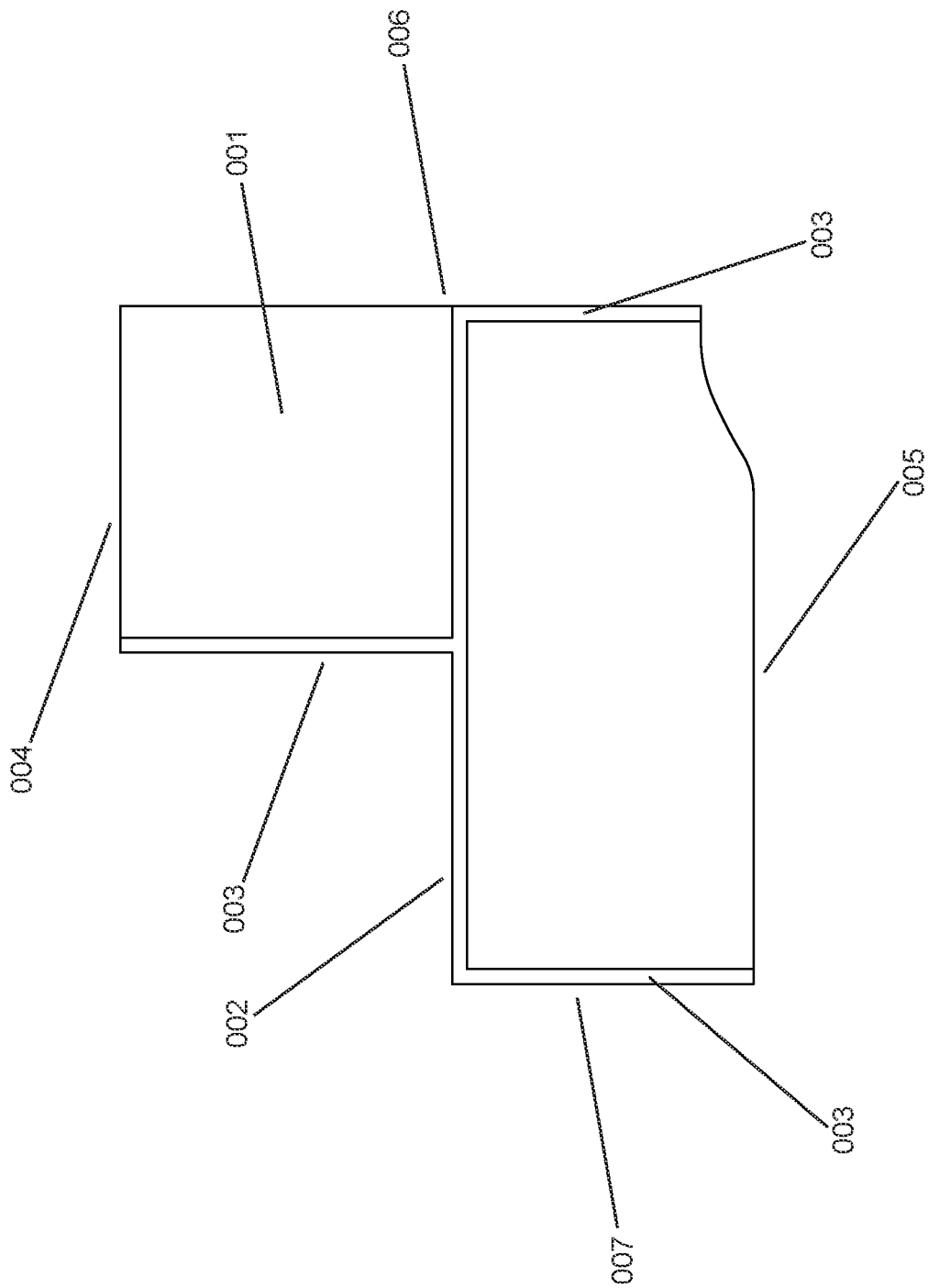
FIG. 11. A bottom view of an "L" shaped device and system to hold cargo when rear vehicle seats do not lay flat with a raised longitudinal brace.

FIG. 11. A bottom view of an "L" shaped device and system to hold cargo when rear vehicle seats do not lay flat with a raised longitudinal brace 003. A crosswise brace 002 is connected perpendicular to a flat shelf 001 and spans from a left edge 006 and a right edge 007. Longitudinal braces 003 are connected perpendicular to a flat shelf 001 and span from a rear edge 005 to the crosswise brace 002. A flat shelf has an "L" shape and a longitudinal brace 003 spans from a crosswise brace 002 to a front edge 004.

Figure 12:
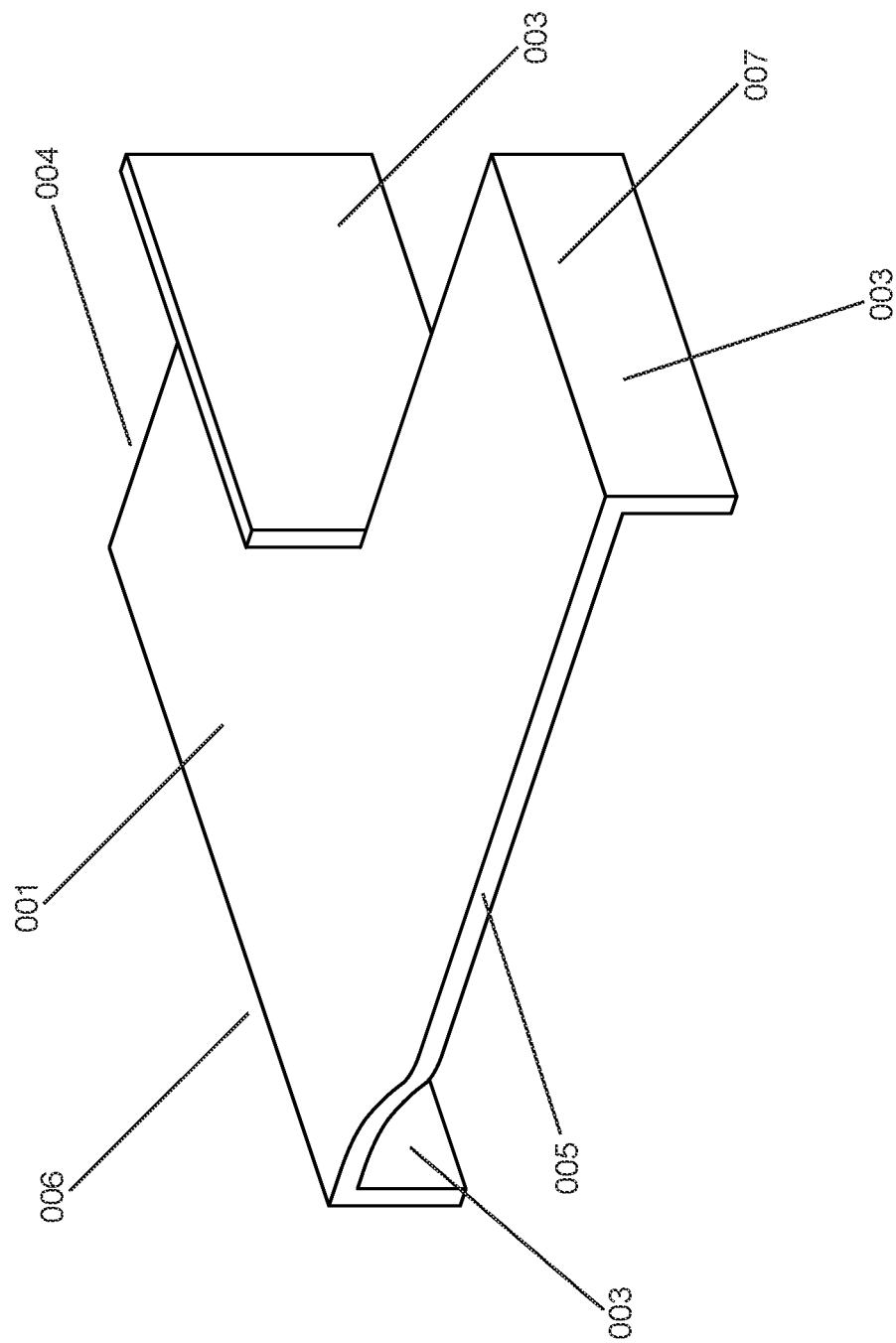
FIG. 12. A perspective view of an "L" shaped device and system to hold cargo when rear vehicle seats do not lay flat with a raised longitudinal brace.

FIG. 12. A perspective view of an "L" shaped device and system to hold cargo when rear vehicle seats do not lay flat with a raised longitudinal brace 003.

Figure 13:
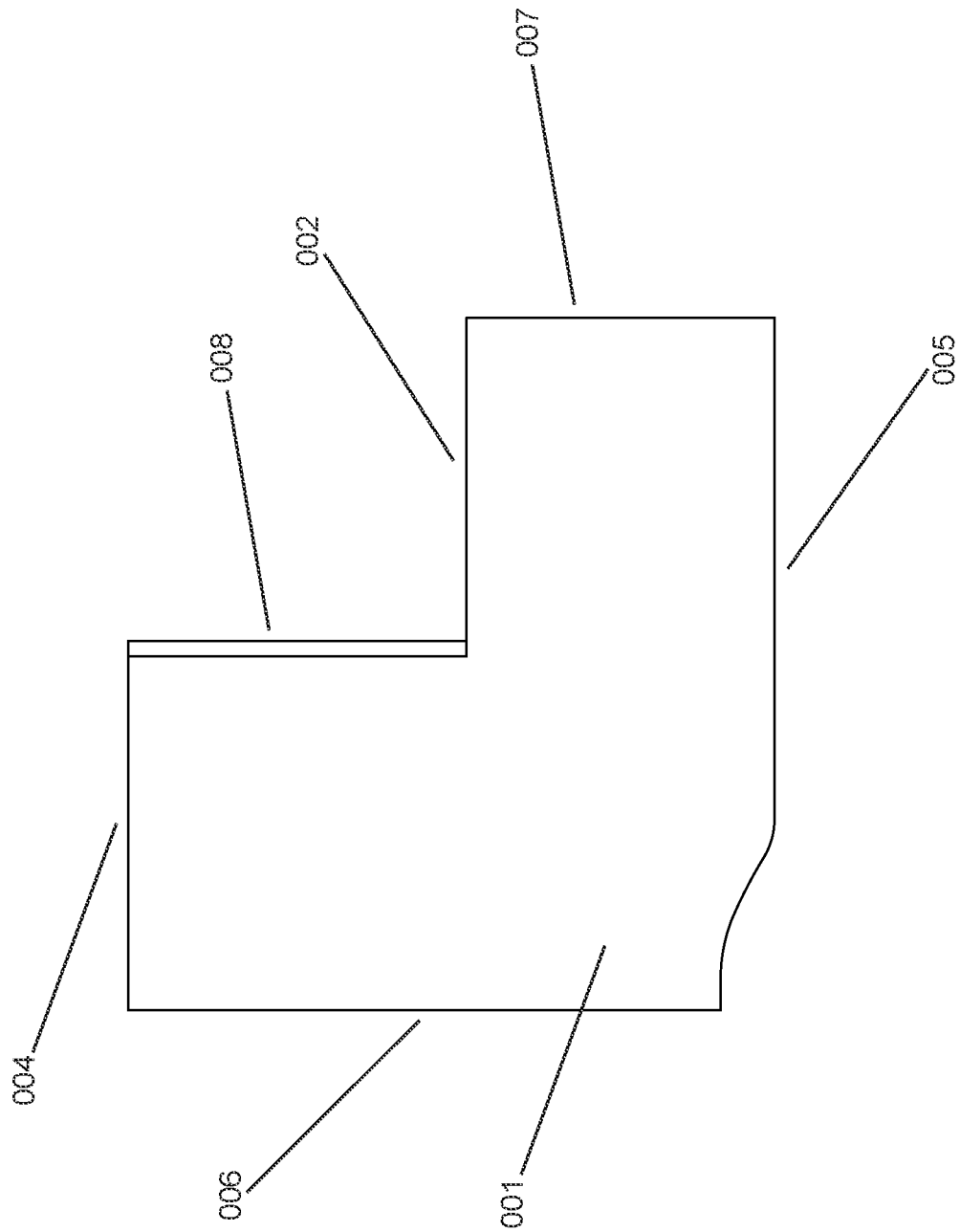
FIG. 13. A top view of an "L" shaped device and system to hold cargo when rear vehicle seats do not lay flat with a hinged cover to hide a passenger seat.

FIG. 13. A top view of an "L" shaped device and system to hold cargo when rear vehicle seats do not lay flat with a hinged cover 008 to hide a passenger seat.

Figure 14:
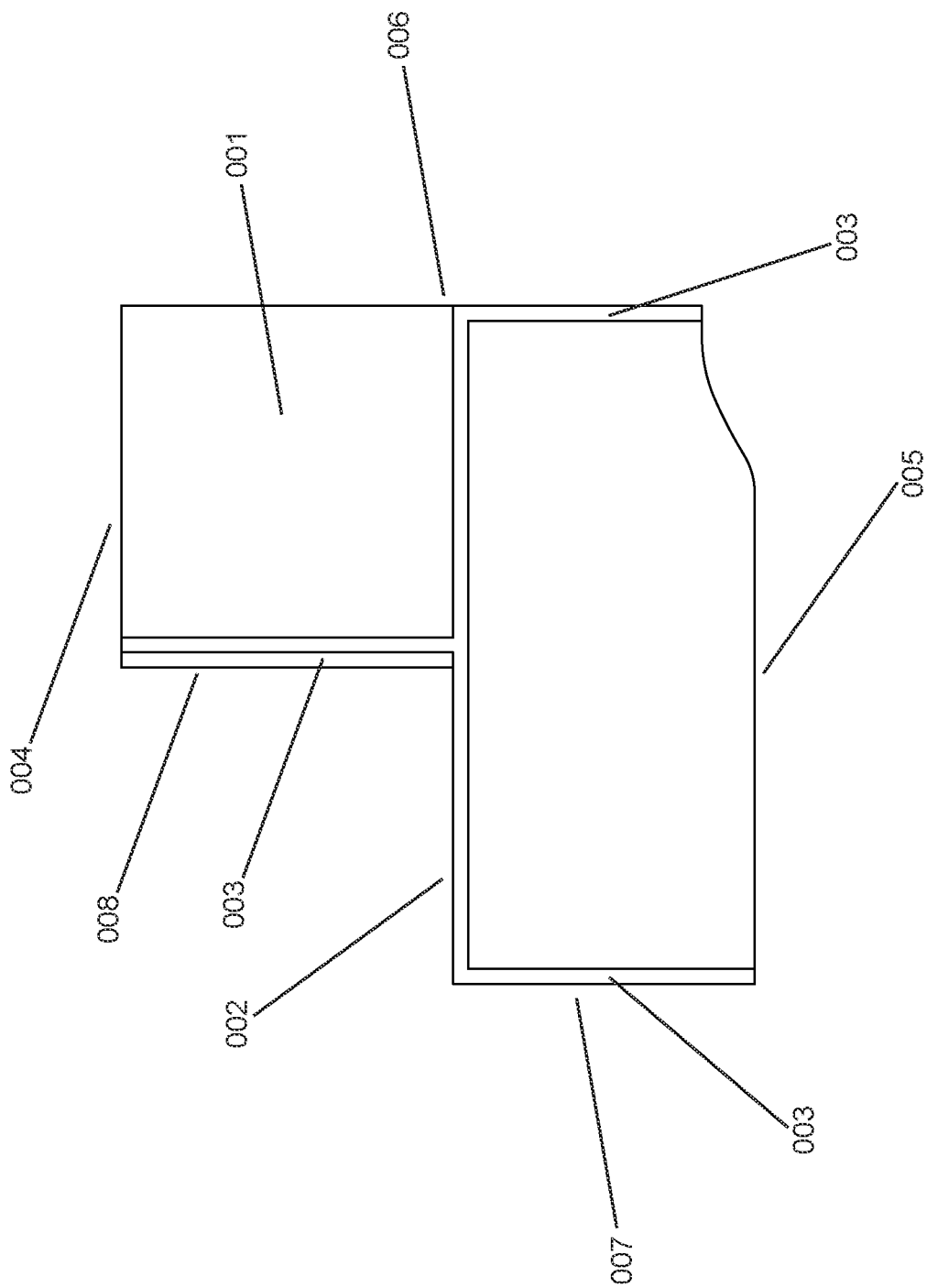
FIG. 14. A bottom view of an "L" shaped device and system to hold cargo when rear vehicle seats do not lay flat with a hinged cover to hide a passenger seat.

FIG. 14. A bottom view of an "L" shaped device and system to hold cargo when rear vehicle seats do not lay flat with a hinged cover 008 to hide a passenger seat. A crosswise brace 002 is connected perpendicular to a flat shelf 001 and spans from a left edge 006 and a right edge 007. Longitudinal braces 003 are connected perpendicular to a flat shelf 001 and span from a rear edge 005 to the crosswise brace 002. A flat shelf has an "L" shape and a longitudinal brace 003 spans from a crosswise brace 002 to a front edge 004. The device with a hinged cover 008 to hide a passenger seat.

Figure 15:
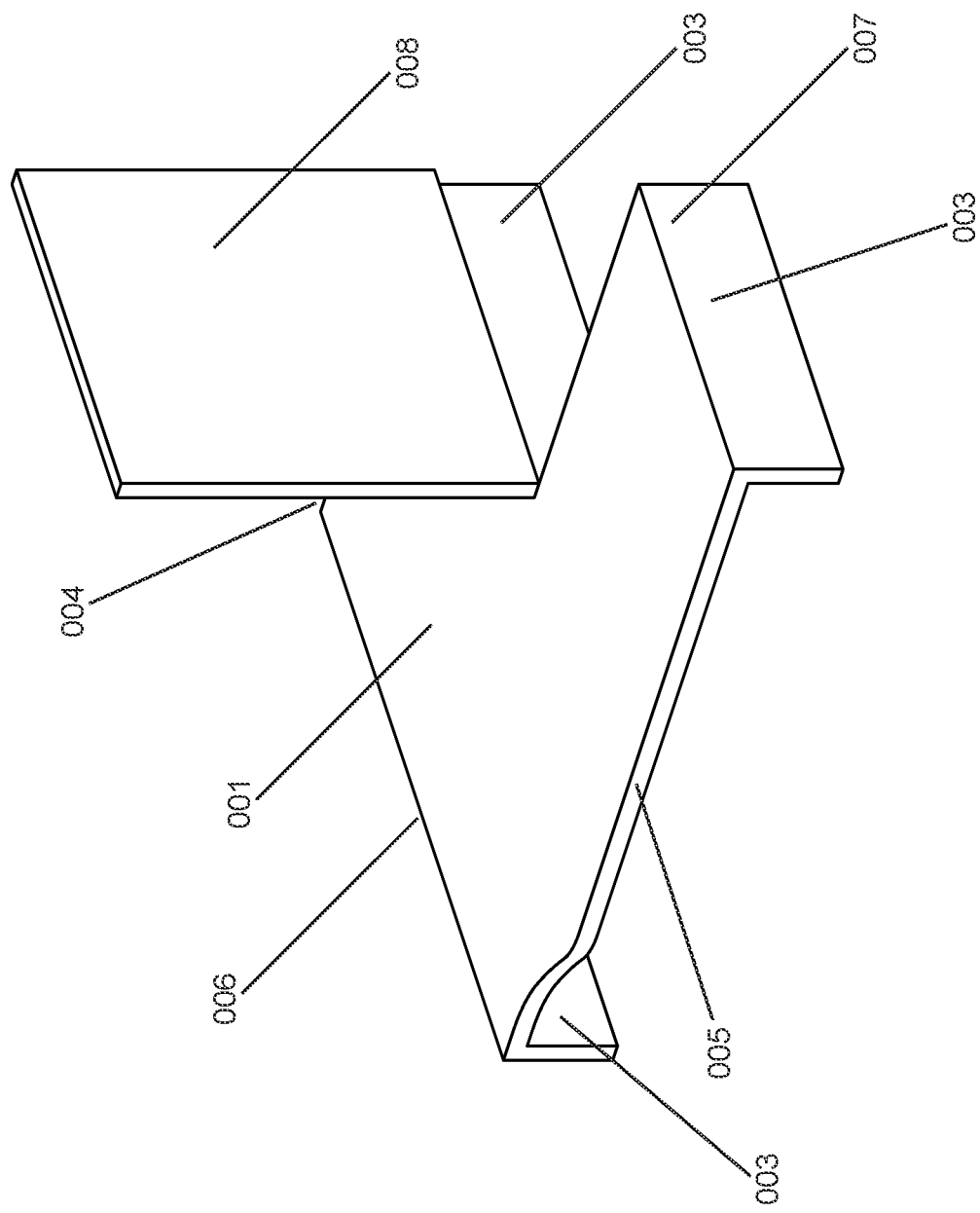
FIG. 15. A perspective view of an "L" shaped device and system to hold cargo when rear vehicle seats do not lay flat with a hinged cover to hide a passenger seat.

FIG. 15. A perspective view of an "L" shaped device and system to hold cargo when rear vehicle seats do not lay flat with a hinged cover 008 to hide a passenger seat. In the figure a hinged cover 008 to hide a passenger seat is shown in a raised position.

Figure 16:
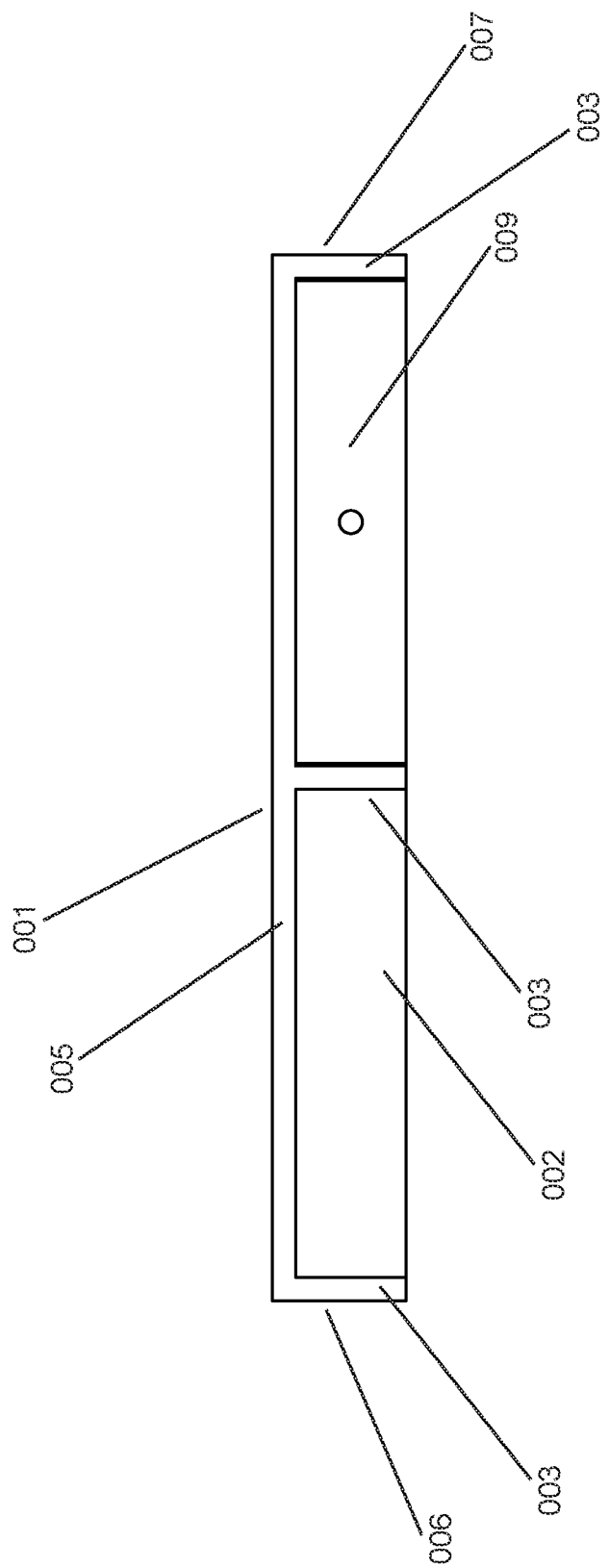
FIG. 16. A rear view of a device and system to hold cargo when rear vehicle seats do not lay flat rotated 90° clockwise rear-view from FIG. 1 with an optional drawer.

FIG. 16. A rear view of a device and system to hold cargo when rear vehicle seats do not lay flat rotated 90° clockwise rear-view from FIG. 1 with an optional drawer 009.

Figure 17:
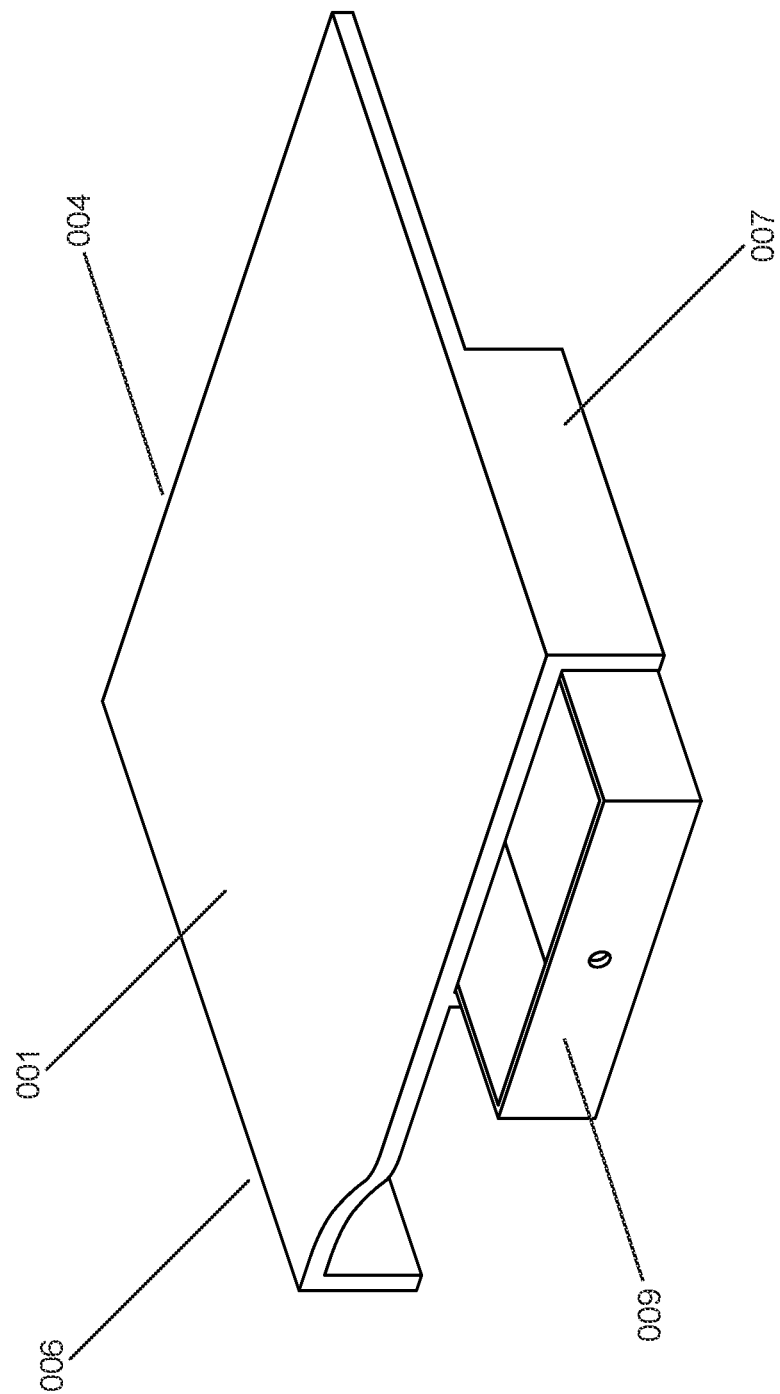
FIG. 17. A perspective view of a device and system to hold cargo when rear vehicle seats do not lay flat with an optional drawer.

FIG. 17. A perspective view of a device and system to hold cargo when rear vehicle seats do not lay flat with an optional drawer 009.

A version of the invention may be a method of adapting a cargo area with a device and system to hold cargo when rear vehicle seats do not lay flat, comprising: selecting a hypothetical cargo area, a flat shelf 001; a middle crosswise brace 002; and two longitudinal braces 003.

Versions of a device and system to hold cargo when rear vehicle seats do not lay flat may be made individually, in batches, or via continuous assembly.

For example, to make an embodiment of a version of a device and system to hold cargo when rear vehicle seats do not lay flat prepare an appropriate work surface and assemble all of the components disclosed herein. Assemble the components in a logical order as someone skilled in the art would do. For example, start with a flat shelf 001 cut to a particular length and width of a cargo area; a middle crosswise brace 002 of a length from the left edge 006 to the right edge 007; two longitudinal braces of a length from the rear edge 005 to the middle crosswise brace 002. Lay the flat shelf 001 on the side intended to be the top; place the middle crosswise brace 002 at a distance from the rear edge 005 appropriate to the distance to the rear seats; place each longitudinal brace along the left and right edge 007 perpendicular the middle crosswise brace 002. Verify the positions and layout of the braces. Using adhesive, remove each brace apply adhesive to the brace and then re-connect the brace to the flat shelf 001. After the adhesive dries test fit the device to the hypothetical cargo area and verify the fit. If the fit is acceptable, prepare the components for final finishing. Final finishing may include fiberglass sheets and resin, sanding, painting, and finishing with polyurethane. Furthermore, a non-skid material can be applied to the top shelf.

An example to use the assembled version of a device and system to hold cargo when rear vehicle seats do not lay flat comprises placing the assembled components in the cargo area. Select appropriate cargo, if desired, to store in the cargo area on the device and system to hold cargo when rear vehicle seats do not lay flat.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

The embodiments of a device and system to hold cargo when rear vehicle seats do not lay flat may be utilized individually, concurrently, or in any sequential combination.

Those skilled in the art to which this application relates will appreciate that other and further additions, deletions, substitutions and modifications may be made to the described embodiments.

The specification is not to be taken in a limiting sense, but is made merely for the purpose of describing the general principles of exemplary embodiments; many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

The invention is described with such embodiments, but the invention is not limited to any embodiment. The scope of the invention is limited only by the claims and the invention encompasses numerous alternatives, modifications and equivalents. Several specific details are set forth in the description to provide a thorough understanding of the invention. These details are provided for the purpose of example and the invention may be practiced according to the claims without some or all of these specific details. In general, the order of the steps of disclosed processes may be altered within the scope of the invention.

Unless otherwise indicated, the drawings are intended to be read (e.g., arrangement of parts, proportion, degree, etc.) together with the specifications, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

What is claimed:

1. A device to create a flat cargo storage area in a vehicle, comprising:
    a flat shelf of a given length, width, and thickness having a top and bottom;
    the flat shelf further comprising
        a front edge;
        a rear edge;
        a left edge; and
        a right edge;
    a cut-out on the rear edge to allow a cargo door to close;
    a middle crosswise brace of a given length, width, and thickness connected to the bottom of the flat shelf and spanning from the left edge to the right edge, wherein the middle crosswise brace is connected perpendicular to underside of the flat shelf from the left edge to the right edge; and
    a plurality of longitudinal braces of a given length, width, and thickness connected to the bottom of the flat shelf and spanning from the rear edge to the middle crosswise brace along the left edge and the right edge, wherein each of the plurality of longitudinal braces on same side of the flat shelf creates a flat shell area on an opposite side of the flat shelf.

2. The device to create a flat cargo storage area in a vehicle of claim 1 wherein the flat shelf, middle crosswise brace, and longitudinal braces are separate components connected together.

3. The device to create a flat cargo storage area in a vehicle of claim 1 wherein the flat shelf, middle crosswise brace, and longitudinal braces are a single component.

4. The device to create a flat cargo storage area in a vehicle of claim 1, wherein the flat shelf comprises two segments, a primary segment and an extending segment, wherein the extending segment is hingedly attached to the primary segment and is deployable to form an "L" shape with the primary segment, thereby increasing the effective surface area of the flat shelf for accommodating larger cargo items.

5. The device to create a flat cargo storage area in a vehicle of claim 1 comprising:
    the hinged section of a given length and width that when closed completes the flat shelf.

6. The device to create a flat cargo storage area in a vehicle of claim 1 further comprising a drawer assembly.

7. The device to create a flat cargo storage area in a vehicle of claim 1 further comprising a skid-resistant surface on the top of the flat shelf.

8. A system to create a flat cargo storage area in a vehicle, comprising:
    a flat shelf of a given length, width, and thickness having a top side and bottom;
    the flat shelf further comprising
        a front edge;
        a rear edge;
        a left edge; and
        a right edge;
    a cut-out on the rear edge to allow a cargo door to close;
    a middle crosswise brace of a given length, width, and thickness connected to the bottom of the flat shelf and spanning from the left edge to the right edge, wherein the middle crosswise brace is connected perpendicular to underside of the flat shelf from the left edge to the right edge; and
    a plurality of longitudinal braces of a given length, width, and thickness connected to the bottom of the flat shelf and spanning from the rear edge to the middle crosswise brace along the left edge and the right edge, wherein each of the plurality of longitudinal braces on same side of the flat shelf creates a flat shell area on an opposite side of the flat shelf.

9. A method of holding cargo with the device to create a flat cargo storage area in a vehicle as recited in claim 1, comprising:
    selecting a vehicle with an appropriate cargo area for a device and system to hold cargo when rear vehicle seats do not lay flat;
    positioning the device comprising a flat shelf, a middle crosswise brace, and longitudinal braces connected together in the cargo area of the vehicle;
    securing the device in the cargo area;
    placing cargo on the flat shelf of the device; and
    using the device to stabilize and hold the cargo securely during vehicle movement, wherein the placement of the device and system in the cargo area of the vehicle allows safe storage and use of the cargo area.

* * * * *